Nov. 13, 1962 C. A. OHMS 3,063,486
ATTACHMENT FOR MIXING AND GRINDING MACHINE
Filed July 27, 1961
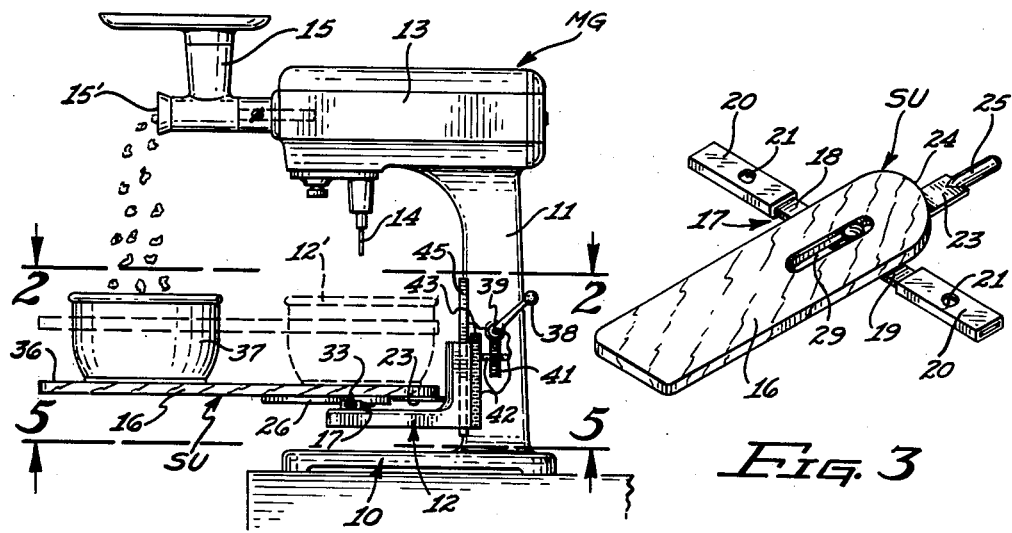
Fig. 1
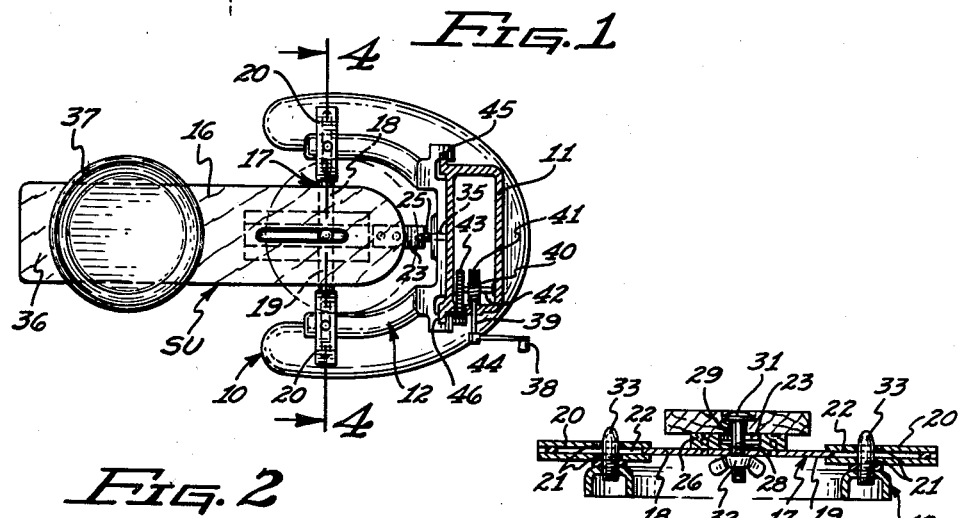
Fig. 2 Fig. 3
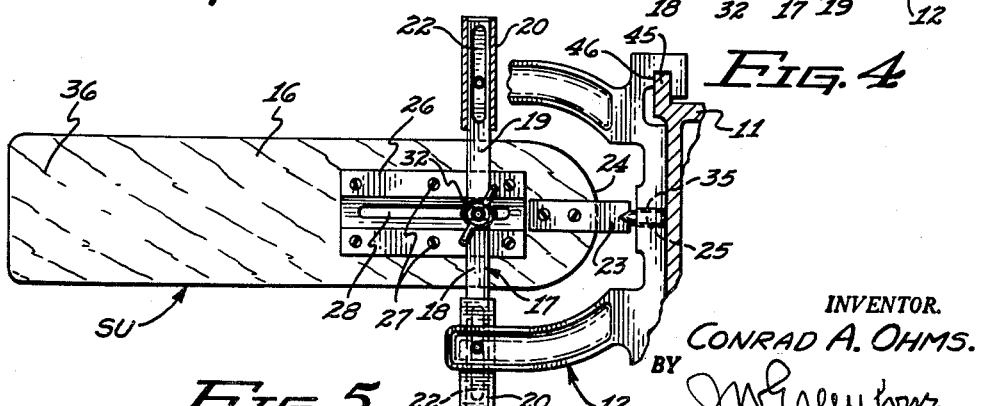
Fig. 4
Fig. 5
INVENTOR.
CONRAD A. OHMS.
BY
ATTORNEY.

United States Patent Office 3,063,486
Patented Nov. 13, 1962

3,063,486
ATTACHMENT FOR MIXING AND
GRINDING MACHINE
Conrad A. Ohms, Phoenix, Ariz., assignor of fifty percent to Henry Gabaldon, Maricopa County, Ariz.
Filed July 27, 1961, Ser. No. 127,311
2 Claims. (Cl. 146—182)

The present invention relates to an attachment for a mixing and grinding machine having a platform for supporting a bowl to contain material to be mixed and having the discharge outlet for ground material at a point removed from the platform for supporting the bowl.

An object of the invention is to provide supporting means in cooperation with the bowl platform whereby a container may be supported to receive ground discharged material.

Another object of the invention is to provide an elongated support unit which may be readily attached to or removed from the bowl platform.

A further object of the invention is to provide an elongated support unit having adjustable means for attachment to or removable from bowl platforms of different dimensions.

Other objects and advantages of the invention will be apparent from the following description together with accompanying drawings in which:

FIG. 1 is a side elevational view of a mixing and grinding unit showing the present elongated support unit in position to hold a container to receive material from the grinder;

FIG. 2 is a cross sectional view taken on line 2—2 in FIG. 1;

FIG. 3 is a perspective view of the elongated support unit;

FIG. 4 is a cross sectional view taken on line 4—4 in FIG. 2, and

FIG. 5 is a view taken on line 5—5 in FIG. 1 showing the under side of the support unit partly in cross section.

As shown, the present invention may be applied to a mixing and grinding machine of any well known type as indicated in the drawing by reference character MG.

Machines of this type include a base 10 from which extends a pedestal 11 which latter serves as a support for an adjustable mixing bowl support 12. At the upper part of the pedestal is a casing 13 enclosing mechanism for rotating a spindle 14 to which may be attached a blade, not shown, to agitate material disposed in bowl 12' as indicated in dotted lines in FIG. 1. At one end of casing 13 is a grinder 15, as commonly used in combination with the mixer, and having a discharge outlet 15' in spaced relation to the bowl support 12. When the grinder is in use it has heretofore been necessary to either manually hold or provide a box or other means to support a container to receive discharged material which presented certain disadvantages.

In accordance with the present invention a container support unit, indicated as a whole by the reference character SU (see FIG. 3) is provided, which unit may be applied to the mixer when needed or removed at will.

The support unit, as shown, includes an elongated member 16 and a cross-piece 17 to provide oppositely extending lateral arms 18 and 19. Each arm is provided with a slide member 20 having an aperture 21 and each of the arms is formed with a slot 22 (see FIG. 4). Secured to the normal underside of member 16 is an end piece 23 which extends from end 24 of member 16 and is provided with a pin 25.

As shown in FIGS. 4 and 5, a bearing member 26 is secured to the under side of member 16 by screws 27 and is provided with a slot 28 in alignment with a slot 29 in member 16. A bolt 31 extends through slot 29 of member 16, slot 28 of bearing member 26, and through cross-piece 17 intermediate the ends thereof The bolt 31 is provided with wing nut 32. By means of wing nut 32 the cross-piece 17 may be secured in fixed relation to the elongated member 16 and by means of the wing nut and bolt 31 the cross-piece may be released and moved longitudinally of the member 16 or rotated about the bolt and secured in a selected adjusted position.

The supporting unit SU may be applied to a mixer and grinder of the type shown. In some cases the bowl support is provided with studs which enter sockets at the bottom of the bowl to hold the bowl in place which studs may be used in cooperation with the present support unit SU. When the bowl support is not provided with studs it may, as shown, be furnished with studs 33 threadedly secured to and at opposite sides of the bowl support for disposition in apertures 21 of the slide members 20. The rear portion 34 of the bowl support 12, adjacent to the pedestal 11, is provided with a socket 35 to receive the pin 25 integral with member 16. The support unit SU may, in conjunction with studs 33 and socket 35, be attached to the bowl support 12 with an end 36 of the unit in position to hold a container 37 to collect material discharged from the grinder 15.

It is the practice to provide mixer machines with means to raise or lower the bowl support. As shown in the drawing, a crank 38 having a shaft 39 is journaled in the wall of the pedestal 11. Worm gear 40 mounted on shaft 39 engages worm wheel 41 on rotatable shaft 42 having secured thereto a pinion 43 which engages a rack 44 integral with bowl support 12. The pedestal is formed with vertical lateral guide strips 45 and the bowl support is provided with channels 46 in which the guide strips are positioned whereby a rotation of crank 38 will cause the bowl support to move vertically relative to the pedestal 11.

As will be evident the support unit SU may be applied to mixing and grinding machines currently in use and having a bowl support 12 provided with a socket 35. In some cases as mentioned the bowl support is formed with studs which cooperate with the bowl to hold it in place. If a bowl support does not have studs they may, as shown, be provided and suitably located.

The arms 18 and 19 of the support unit are positioned so as to insert studs 33 in apertures 21 of slide members 20. The slide members being adjustable relative to the arms 18 and 19 serve to make the support unit applicable to bowl supports of different widths. Since the bowl supports of different machines may vary in form, so as to locate the studs different distances from the rear of the bowl support, the cross-piece 17 may be adjusted end-wise of elongated member 16. This is, as shown, made practical by means of bolt 31 and wing nut 32 whereby the cross-piece 17 may be moved along the member 16 to a selected position to permit the insertion of the studs into apertures 21 of the slide members 20 and by means of the wing nut secured in fixed selected location relative to the elongated member 16.

From the above it will be evident that the present support unit may be readily applied when it is found desirable to provide a support for a container to collect ground material at a point removed from the bowl support which container support is readily removable when the grinder is not in use.

Although a preferred embodiment of the invention is shown and described herein, it is to be understood that modifications may be made therein without departing from the scope and spirit of the invention as set forth in the appended claims.

What is claimed is:

1. An attachment for a machine having a rotary member, a support for a bowl for material to be mixed by said rotary member, said machine having a grinder with a discharge outlet spaced from said bowl support, an elongated support member, means for securing one end of said elongated support to said bowl support to position the other end of said elongated support adjacent to said grinder discharge outlet to support a container to receive material discharged from said discharge outlet.

2. An attachment for a mixing and grinding machine having a bowl support provided with studs and having a socket in spaced relation to said studs, said attachment comprising a support unit for holding a container to receive material discharged from said grinder, said unit including an elongated member having one end positioned adjacent to said grinder, said member having a pin for disposition in said socket and a cross piece having apertures to receive said studs to hold said unit in fixed relation to said bowl support to hold said container in position to receive material discharged from said grinder.

References Cited in the file of this patent

UNITED STATES PATENTS

| | | |
|---|---|---|
| 992,226 | Houghton | Aug. 1, 1911 |
| 1,882,980 | Schrader | Oct. 18, 1932 |
| 3,017,152 | Alpaugh | Jan. 16, 1962 |